3,085,904
POLYESTER PRINTING SCREEN
Joseph R. Ehrlich, 1793 Riverside Drive, New York, N.Y.
No Drawing. Filed Mar. 28, 1960, Ser. No. 17,739
2 Claims. (Cl. 117—98)

The present invention relates generally to improvements in the field of screen printing and decorating and it relates more particularly to an improved printing screen of polyester fabric, utilizing sensitized gelatin or the like films, and to an improved method for producing same.

There are various methods of screen printing which art finds application mainly in the field of textile printing and, additionally, in the fields of display, electronics, aircraft and missiles, toys, posters, apparatus and the like and, generally, to practice the same, there is applied by lamination to the base fabric forming the screen, a stencil made of water-insoluble plastic sheeting, or of water-soluble polyvinyl alcohol, or gelatin rendered water-insoluble and forming a film by light and/or chemical means; or by initially casting or coating such water-soluble film-forming materials onto the base fabric and, after drying, sensitizing said film for subsequent insolubilization by photo-chemical reaction.

In either of these general approaches, the fabric forming the base for the end-product printing screen must be free of clogging at those zones between the weft and warp of the fabric while, at the same time, the stencil or coating of sensitized gelatinous film must be firmly adhered to the weft and warp strands of the fabric.

Heretofore, natural silk screens have been conventionally employed for this purpose. However, with the higher standards required by the recent new applications of the screen printing process and with the more rigid uniformity and quality demands, the use of a silk screen possesses numerous drawbacks and disadvantages and leaves much to be desired.

It is thus a principal object of the present invention to provide an improved screen member of polyester fabric for use in the screen printing process and an improved method for producing the same to provide true registration.

Another object of the present invention is to provide an improved printing screen of polyester fabric having high strength, uniformity and long life and capable of repeated washings and relatively rough handling.

Still another object of the present invention is to provide a printing screen of polyester fabric having great stability and which is substantially unaffected by varying atmospheric and environmental conditions.

A further object of the present invention is to provide an improved printing screen of the above nature which is compatible with and readily and firmly adheres to conventional stencils or coatings, such as sensitized gelatin film, and which is characterized by its low cost and ease of use.

It has been found that the polyester fibers as typified by polyethylene terephthalate filaments and yarns such as that trademarked Dacron, possess the physical and chemical properties which render them highly superior for use in a printing screen to any fibers heretofore employed. The polyester fibers have a high tensile strength and a high abrasion resistance. They can withstand repeated severe washing and handling operations without affecting their dimensions and physical properties, they dry faster and are highly chemical-resistant and may be subjected to relatively high temperatures. Furthermore, the filaments can be produced in very fine denier, spun into fine yarns which are highly suitable for weaving into screens of the desired fineness and porosity. In addition, the polyester screens are highly dimensionally stable under varying environments and atmospheric conditions. It is apparent from the above that the physical properties and characteristics of the polyester fibers render them ideally suited for use as the base fabric in a printing screen.

However, the conventional film stencils and coatings do not of themselves adhere to a screen formed of polyester yarn by virtue of the highly hydrophobic properties of the polyester yarn and the hydrophilic properties of the gelatin film, forming part either of the stencil or the coating, as the case may be, nor are the sizes and primers heretofore employed for adhering the stencil or coating to the base fabric satisfactory. A primer, to function properly, must suitably bind the stencil or coating to the screen, withstand handling and washing, be flexible and substantially immune to cracking and peeling and should not block the pores in the screen.

It has been found that a priming or sizing composition comprising soluble albumen plasticized by a humectant such as glycerin, when intermixed and applied to a polyester yarn screen base, and the albumen of the applied mixture is heat-cured or otherwise cured, there is imparted to the thus coated screen base the characteristics and ability for adherence thereto of the stencils or coatings of gelatin films or the like. The humectant and albumen, when intermixed as above, form a solution which is applied to the screen base, and when the albumen of such solution is cured as so carried by the polyester yarn screen base to which it is applied, it is believed that a structure of coagulated albumen is formed which is sponge-like in its characteristics, and which firmly adheres to the strands of the polyester yarn screen base; the humectant, glycerin, which forms part of the solution being adsorbed by and substantially impregnating the albumen sponge. Since the humectant is hydrophilic in nature, its presence in the thus-formed albumen sponge coating of the polyester strands provides a hydrophilic surface for the strands of the screen base which renders them compatible with and firmly adherent to and by the gelatin film applied thereto in stencil or coating form.

In this manner, there is anchored to the strands of the normally hydrophobic polyester screen base fabric, the stencil or coating of gelatin film which is hydrophilic; the bonding medium between the hydrophobic polyester strands and the hydrophilic gelatin film being the aforesaid size or primer comprising the cured albumen sponge anchored to the polyester yarn and having adsorbed therein glycerin as the hydrophilic humectant.

Moreover, such primer does not significantly reduce the pliability and flexibility of screen, can withstand rough handling and repeated washings and does not appreciably reduce the screen pore size. The albumen is initially applied to the screen in a vital or soluble state and is thereafter desolubilized by heat. The relative proportions by weight of the ingredients are 5 to 12 parts albumen and 10 to 20 parts glycerin. While glycerin is highly preferred as the humectant or plasticizer, other water-soluble humectants or plasticizers may be employed such as the polyhydroxy compounds typified by propylene glycol, ethylene glycol, trimethylene glycol, triethylene glycol, the polyglycols, and the like.

In addition to the albumen and humectant, other additives may be included such as bacteriacides and fungicides. Generally, water-solutions of the albumen and humectant in the proportions specified are of relatively low concentration, permitting their application to the screen without closing or appreciably reducing the screen pore openings.

The aforesaid coating after application to the screen and the curing and drying steps, preferably has a ratio by weight of one part desolubilized albumen and 1.7 parts of glycerin.

In applying the primer to the screen fabric, standard textile treating equipment may be employed. The method generally consists in passing the polyester screen fabric through an aqueous solution of the albumen, humectant and other additives, preferably including an alkaline solubilizing agent such as ammonium hydroxide, and thence through a pair of squeeze rolls to express excess solution from the screen fabric and control the solution pickup. Thereafter, the sized screen fabric is passed through a tunnel drier where the water is driven off and the temperature raised above 100° C. for at least one to two minutes to insolubilize the albumen.

According to a preferred example of the present invention, a solution was prepared containing by weight about 8% soluble egg albumen (which may be advantageously varied between 5% and 12%) and 13.5% glycerin (which may be advantageously varied between 7% and 9%), with the remainder being water plus 0.50% ammonium hydroxide (28% concentration).

In preparing the sizing solution, the egg albumen, as light colored flakes, is slowly added to the water at room temperature while being strongly agitated by a motor-driven stirrer, the glycerin being added before, during or after the dissolving of the albumen. During the dissolving of the albumen, the ammonium hydroxide is added. Any suitable bacteriacides and fungicides may also be included in the solution, such as the Dowcides marketed by the Dow Chemical Company or any other well-known bacteriacidal and fungicidal agents. It has been found advisable to add to the solution, during the preparation thereof, a defoaming agent such as from 0.05% to 0.1% by weight of Antifoam A emulsion, a silicone product marketed by the Dow-Corning Company.

The polyester screen fabric, which is preferably of a range between 7xx and 16xx meshes, is then immersed or passed through the above priming solution and thereafter between a pair of squeeze rolls to express the excess solution from the fabric. The solution-carrying fabric, while supported under tension, is then transported through a drying and curing oven for a period of one to two minutes at a temperature of 240° F. to 270° F. to evaporate the water and desolubilize the albumen. The screen fabric may be dried and cured under tension in any well-known manner, such as by employing a tentering frame. The screen fabric is now finished and may be used in any well-known manner. It possesses the highly desirable adhesion characteristics and physical properties set forth above. The dry weight increase of the polyester yarn after coating is approximately .3 to 6.0%, and preferably between 1.0 to 2.0%.

It should be noted that when the screen fabric is subjected to the washing, brushing and scrubbing operations normally attendant to the removal of the hardened or cured gelatin film type stencil from the screen, the action is vigorous and soap and detergents are employed. While the albumen adheres to the screen yarns during many such operations, the glycerin humectant carried in the albumen sponge is less adherent and gradually is leached out of the albumen sponge. However, the glycerin content of the albumen-humectant primer may be easily and readily replenished by using an aqueous glycerin solution as the last wash or by merely dabbing the polyester screen base carrying the firmly adherent albumen sponge with an aqueous glycerin solution and then drying the screen base. The concentration of this glycerin solution should be between 10% and 20% and preferably between 13.5% and 15%.

While there have been described, by way of example, preferred embodiments of the present invention, it is apparent that numerous alterations, omissions and additions may be made without departing from the spirit thereof.

What is claimed is:

1. An improved material for use in screen printing comprising a woven porous mesh fabric formed essentially by polyester threads provided with a coating containing cured albumen and a water soluble humectant, the coating containing the cured albumen being porous and the humectant being adsorbed within the cured albumen.

2. An improved material for use in screen printing comprising a woven porous mesh fabric formed essentially by polyester threads provided with a coating containing cured albumen and a water soluble humectant, the cured albumen being sponge-like in form and adhering to the mesh fabric and the water-soluble humectant being adsorbed in the cured albumen.

References Cited in the file of this patent

UNITED STATES PATENTS

| 1,256,240 | Lovell | Feb. 12, 1918 |
| 2,011,246 | Hyden | Aug. 13, 1935 |
| 2,500,877 | Sharples | Mar. 14, 1950 |

FOREIGN PATENTS

| 486,701 | Canada | Sept. 23, 1952 |